United States Patent Office 3,389,166
Patented June 18, 1968

3,389,166
TRIFLUOROMETHYLPHTHALIC ACID AMIDES
Bernard Loev, Broomall, Pa., assignor to Smith Kline & French Laboratories, Philadelphia, Pa., a corporation of Pennsylvania
No Drawing. Original application Aug. 27, 1963, Ser. No. 304,951, now Patent No. 3,246,009, dated Apr. 12, 1966. Divided and this application July 26, 1965, Ser. No. 474,992
4 Claims. (Cl. 260—471)

This application is a divisional application of Ser. No. 304,951, filed Aug. 27, 1963, now Patent No. 3,246,009.

This invention relates to new trifluoromethylphthalic acid amides. These compounds are useful as intermediates for preparing trifluoromethylphthalimides having pharmacodynamic activity such as analgesic and central nervous system stimulant activity and, in particular, having distinctive anti-pyretic activity.

The new trifluoromethylphthalic acid amide intermediates of this invention are represented by the following structural formula:

FORMULA I

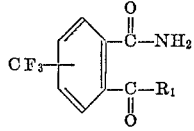

when:

$R_1$ represents amino, hydroxy or lower alkoxy, and $CF_3$ is in a position $\beta$ to a carbonyl group.

The trifluoromethylphthalimides which are prepared from the intermediates of this invention are represented by the following structural formula:

FORMULA II

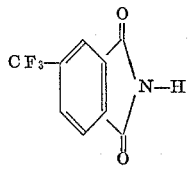

A preferred compound of Formula II is 4-trifluoromethylphthalimide.

The trifluoromethylphthalimides are prepared from the trifluoromethylphthalic acid amides of this invention as follows:

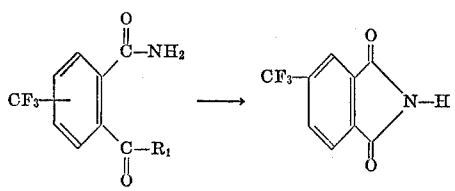

According to the above procedure 4 (or 5)-trifluoromethylphthalamic acid or ester or 4-trifluoromethylphthalic acid diamide is heated conveniently in an inert solvent such as diphenyl ether or chlorobenzene at about 150–250° C. to give 4-trifluoromethylphthalimide.

The 4- or 5-trifluoromethylphthalamic acid intermediates are prepared by treating 4-trifluoromethylphthalic acid with acetic anhydride followed by ammonia. Esterifying 4-trifluoromethylphthalic acid and treating the resulting ester with ammonia at about 50° C. in a lower alkanol solvent gives the trifluoromethylphthalamic acid ester intermediate which on treatment with additional ammonia in a lower alkanol solvent at elevated temperature, such as at the reflux temperature of the reaction mixture, gives the trifluoromethylphthalic acid diamide intermediate.

The following examples are not limiting but are illustrative of the compounds of this invention and procedures for preparing them.

Example 1

Ten grams of 4-trifluoromethylphthalic acid is heated at reflux in 50 ml. of acetic anhydride. Concentrating and distilling gives trifluoromethylphthalic anhydride which is treated with a 5% excess of ammonia in ethanol at 20° C. to give, after concentrating and recrystallizing, 4-trifluoromethylphthalamic acid and also the 5-isomer.

Heating 4.0 g. of the above prepared trifluoromethylphthalamic acid in 50 ml. of diphenyl ether at about 200° C., then cooling, concentrating and filtering gives 4-trifluoromethylphthalimide.

Example 2

A mixture of 5.0 g. of 4-trifluoromethylphthalic acid and 25 ml. of ethanol containing 0.5 ml. of hydrochloric acid is heated at reflux for two hours to give, after concentrating and distilling, diethyl 4-trifluoromethylphthalate.

The above prepared ester is treated with ammonia in ethanol at 50° C. to give the ethyl ester of 4 (and 5)-trifluoromethylphthalamic acid which on treatment with additional ethanolic ammonia at reflux gives, after cooling and concentrating, 4-trifluoromethylphthalic acid diamide.

Heating 4-trifluoromethylphthalic acid diamide in diphenyl ether at 200° C., cooling, concentrating and filtering gives 4-trifluoromethylphthalimide.

Similarly heating the ether ester of 4 (or 5)-trifluoromethylphthalamic acid, prepared as described above, in diphenyl ether gives 4-trifluoromethylphthalimide.

What is claimed is:

1. A compound of the formula:

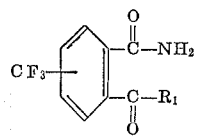

in which:
$R_1$ is a member selected from the group consisting of amino, hydroxy and lower alkoxy and
$CF_3$ is in a position $\beta$ to a carbonyl group.

2. A compound of the formula:

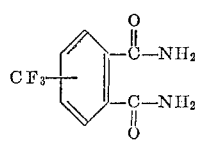

in which CF$_3$ is in a position β to a carbonyl group.

3. A compound of the formula:

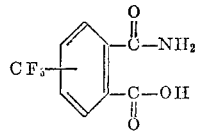

in which CF$_3$ is in a position β to a carbonyl group.

4. A compound of the formula:

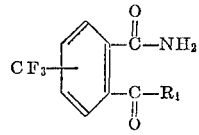

in which:
R$_1$ is lower alkoxy and
CF$_3$ is in a position β to a carbonyl group.

References Cited
UNITED STATES PATENTS
3,231,607   1/1966   Hotten _____ 260—518

LORRAINE A. WEINBERGER, *Primary Examiner.*
L. A. THAXTON, *Assistant Examiner.*